United States Patent
Wang et al.

(10) Patent No.: US 11,990,962 B2
(45) Date of Patent: May 21, 2024

(54) CHANNEL TRANSMISSION METHOD AND COMMUNICATION DEVICE

(71) Applicant: DATANG MOBILE COMMUNICATIONS EQUIPMENT CO., LTD., Beijing (CN)

(72) Inventors: Lei Wang, Beijing (CN); Jiaqing Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 17/764,349

(22) PCT Filed: Aug. 7, 2020

(86) PCT No.: PCT/CN2020/107978
§ 371 (c)(1),
(2) Date: Mar. 28, 2022

(87) PCT Pub. No.: WO2021/057286
PCT Pub. Date: Apr. 1, 2021

(65) Prior Publication Data
US 2022/0352941 A1 Nov. 3, 2022

(30) Foreign Application Priority Data
Sep. 26, 2019 (CN) .......................... 201910919196.7

(51) Int. Cl.
*H04B 7/06* (2006.01)
*H04W 72/23* (2023.01)

(52) U.S. Cl.
CPC .......... *H04B 7/0617* (2013.01); *H04W 72/23* (2023.01)

(58) Field of Classification Search
CPC ... H04L 5/0053; H04L 5/0048; H04L 5/0023; H04L 5/0051; H04L 5/0094; H04L 5/001;
(Continued)

(56) References Cited

U.S. PATENT DOCUMENTS

| | | |
|---|---|---|
| 2014/0126384 A1 | 5/2014 | Feng et al. |
| 2017/0006548 A1 | 1/2017 | Guo et al. |

(Continued)

FOREIGN PATENT DOCUMENTS

| | | |
|---|---|---|
| CN | 102857954 A | 1/2013 |
| CN | 108632007 A | 10/2018 |

(Continued)

OTHER PUBLICATIONS

Extended European Search Report dated Oct. 14, 2022 for Application No. EP 20869559.3.
(Continued)

*Primary Examiner* — Eva Y Puente
(74) *Attorney, Agent, or Firm* — Harness, Dickey & Pierce, P.L.C.

(57) ABSTRACT

A channel transmission method and a communication device are provided. The method includes: determining a transmission beam corresponding to a monitoring occasion MO in a monitoring window of a downlink control channel; and transmitting the downlink control channel on the MO according to the transmssion beam corresponding to the MO.

17 Claims, 5 Drawing Sheets

(58) Field of Classification Search
CPC .... H04L 5/005; H04W 72/23; H04W 72/046;
H04W 16/28; H04W 72/1273; H04W
72/0446; H04W 72/21; H04B 7/0695;
H04B 7/088; H04B 7/0617; H04B
7/0408; H04B 7/0626; H04B 7/06; H04B
7/0404
USPC ......................................................... 375/267
See application file for complete search history.

(56) References Cited

U.S. PATENT DOCUMENTS

| | | | |
|---|---|---|---|
| 2017/0367069 | A1 | 12/2017 | Agiwal et al. |
| 2019/0159165 | A1 | 5/2019 | Agiwal et al. |
| 2019/0223168 | A1 | 7/2019 | Li et al. |
| 2019/0297648 | A1* | 9/2019 | Nagaraja .............. H04B 7/0632 |
| 2020/0022126 | A1 | 1/2020 | You et al. |
| 2020/0313747 | A1* | 10/2020 | Xu ....................... H04B 7/0617 |
| 2021/0352646 | A1 | 11/2021 | Li |
| 2022/0053434 | A1* | 2/2022 | Liu ....................... H04L 5/0094 |

FOREIGN PATENT DOCUMENTS

| | | |
|---|---|---|
| CN | 109315009 A | 2/2019 |
| CN | 109803287 A | 5/2019 |
| WO | WO-2015/135219 A1 | 9/2015 |
| WO | WO-2018/059389 A1 | 4/2018 |
| WO | WO-2018/174635 A1 | 9/2018 |
| WO | WO-2019/032882 A1 | 2/2019 |
| WO | WO-2019/099176 A1 | 5/2019 |

OTHER PUBLICATIONS

CATT, "PDCCH-Based Power Saving Signal/Channel Design", Agenda Item 7.2.9.1, 3GPP TSG RAN WG1 Meeting #97, R1-1906350, May 13-17, 2019, Reno, USA.
"Medium Access Control (MAC) protocol specification (Release 15)" 3rd Generation Partnership Project; Technical Specification Group Radio Access Network; NR, 3GPP TS 38.321 V15.3.0 (2018-19).
Ericsson, Change Request, "Miscellaneous non-controversial correction Set III", 3GPP TSG-RAN2 Meeting #107, R2-1911868, Aug. 26-30, 2019, Prague, Czech Republic.
Written Opinion and International Search Report for International Application No. PCT/CN2020/107978, dated Nov. 13, 2020.
Chinese Office Action, dated Nov. 9, 2021 for Chinese Patent Application No. 201910919196.7.
Nokia Networks, "Physical Downlink Control Channel for MTC", Agenda item 7.2.1.1, 3GPP TSG-RAN WG1 Meeting #80bis, R1-151305, Apr. 20-24, 2015, Belgrade, Serbia.
NEC, "Physical downlink control channel for enhanced coverage", Agenda Item 7.2.1.1, 3GPP TSG RAN WG1 Meeting #80bis, R1-151561, Apr. 20-24, 2015 Belgrade, Serbia.
Chinese Office Action dated Apr. 18, 2022 for Chinese Patent Application No. 201910919196.7.
Request for the submission of an Opinion dated Apr. 5, 2023 in Korean Application No. 10- 2022-7014005.
Communication pursuant to Article 94(3) EPC issued Nov. 15, 2023 in European Application No. 20869559.3.
Ericsson, "Additional paging transmission opportunities in NR-U," 3GPP TSG-RAN WG2#106, R2-1907588, May 13, 2019.

* cited by examiner

CHANNEL TRANSMISSION METHOD AND COMMUNICATION DEVICE

CROSS-REFERENCE TO RELATED APPLICATIONS

This application is a national phase under 35 U.S.C. § 371 of PCT International Application No. PCT/CN2020/107978 which has an International filing date of Aug. 7, 2020, which claims priority to Chinese Patent Application No. 201910919196.7, filed Sep. 26, 2019, the entire contents of each of which are hereby incorporated by reference.

TECHNICAL FIELD

The present disclosure relates to the field of communications technology, in particular, relates to a channel transmission method and a communications device.

BACKGROUND

In a communications system, transmission at some frequency bands (such as a FR2 band, which represents a frequency band greater than 6 GHz) requires a terminal and a network side device to have consistent understanding of a transmission beam. There are various ways to determine the transmission beam, for example, the terminal determines SSBs (Synchronization signal Blocks) associated with the terminal during cell search and detects reception of a downlink control channel at a position corresponding to a receiving beam in subsequent detection; the terminal can track a beam through a beam management process and obtain a new transmission beam through a BFR (beam failure recovery) procedure when the beam deteriorates to such an extent as to be incapable of carry transmission. Whatever, the transmission beam needs to be determined by the terminal and the network side device, to ensure that both have same understanding of the transmission beam.

When beam switching occurs, the network side device needs to use MAC (Medium Access Control) CE (Control Element) to activate a new transmission beam. The new transmission beam takes effect 3 milliseconds after a slot in which the terminal feeds back an Acknoeldgement (ACK) related to a command of the MAC CE.

When a beam failure occurs, a beam pair link (BPL) needs to be established between the network side device and the terminal through the BFR procedure. That is, the terminal needs to report a possible new transmission beam through a Random Access Channel (RACH) procedure, and the network device requires confirmation of the transmission beam via a Radio Resource Control (RRC) reallocation or a MAC indication.

It can be seen that when beam change occurs, a propagation delay of a downlink control channel is larger since a taking-effect delay of the new beam is large or a delay of determining the new beam is significant.

SUMMARY

Embodiments of the present disclosure provide a channel transmission method and a communication device, so as to solve the problem of a large propagation delay of a downlink control channel when a beam change occurs.

Some embodiments of the present disclosure provide a channel transmission method, performed by a communication device. The method includes: determining a transmission beam corresponding to a monitoring occasion (MO) in a monitoring window of a downlink control channel; transmitting, according to the transmission beam corresponding to the MO, the downlink control channel on the MO.

Optionally, before the determining the transmission beam corresponding to the monitoring occasion (MO) in the monitoring window of the downlink control channel, the method further includes: determining the monitoring window of the downlink control channel.

Optionally, the monitoring window is a predetermined monitoring window or a monitoring window configured by a network side.

Optionally, when the monitoring window is a monitoring window configured by the network side, the monitoring window is a monitoring window configured by the network side through a high-layer signaling.

Optionally, the determining the transmission beam corresponding to the monitoring occasion (MO) in the monitoring window of the downlink control channel, includes: determining the transmission beam corresponding to the monitoring occasion (MO) in the monitoring window of the downlink control channel according to a corresponding relation between the MO and the transmission beam.

Optionally, the corresponding relation between the MO and the transmission beam is a predetermined corresponding relation or a corresponding relation configured by a network side.

Optionally, when the corresponding relation between the MO and the transmission beam is the predetermined corresponding relation, the predetermined corresponding relation includes: a corresponding relation that a transmission beam corresponding to an i-th MO corresponds to a j-th Synchronization Signal Block (SSB), wherein j=mod(i, Q), mod(i, Q) is a remainder of i divided by Q, i is a numbering value of a MO, j is a numbering value of a SSB, Q is the total number of SSBs sent by the network side; or, when the corresponding relation between the MO and the transmission beam is the corresponding relation configured by the network side, the corresponding relation between the MO and the transmission beam s the corresponding relation configured by the network side through high-layer signaling.

Optionally, the downlink control channel is a downlink control channel carrying a power saving signal.

Optionally, the communication device is a terminal and the transmission beam is a receiving beam, wherein the transmitting, according to the transmission beam corresponding to the MO, the downlink control channel on the MO, includes: detecting, according to the receiving beam corresponding to the MO, reception of the downlink control channel on the MO.

Optionally, the method further includes: if the reception of the downlink control channel is detected, stopping detecting on remaining MOs in the monitoring window.

Optionally, the communication device is a network side device and the transmission beam is a sending beam, wherein the transmitting, according to the transmission beam corresponding to the MO, the downlink control channel on the MO, includes: sending, according to the sending beam corresponding to the MO, the downlink control channel on the MO.

Some embodiments of the present disclosure further provide a communication device, the communication device includes: a determining module, configured to determine a transmission beam corresponding to a monitoring occasion (MO) in a monitoring window of a downlink control channel; a transmitting module, configured to transmit, according to the transmission beam corresponding to the MO, the downlink control channel on the MO.

Optionally, the communication device is a terminal and the transmission beam is a receiving beam, the transmitting module is specifically configured to: detect, according to the receiving beam corresponding to the MO, reception of the downlink control channel on the MO.

Optionally, the communication device is the network side device and the transmission beam is a sending beam, the transmitting module is specifically configured to: send, according to the sending beam corresponding to the MO, the downlink control channel on the MO.

Some embodiments of the present disclosure further provide a communication device, the communication device includes a transceiver, a storage, a processor and a computer program stored on the storage and executable by the processor, the processor is congfigured to determine a transmission beam corresponding to a monitoring occasion (MO) in a monitoring window of a downlink control channel; the processor or the transceiver is configured to transmit, according to the transmission beam corresponding to the MO, the downlink control channel on the MO.

Optionally, before the processor is configured to determine a transmission beam corresponding to a monitoring occasion (MO) in a monitoring window of a downlink control channel, the processor is further configured to: determine the monitoring window of the downlink control channel.

Optionally, the monitoring window is a predetermined monitoring window or a monitoring window configured by a network side.

Optionally, when the monitoring window is the monitoring window configured by the network side, the monitoring window is the monitoring window configured by the network side through high-layer signaling.

Optionally, the processor is specifically configured to: determine the transmission beam corresponding to the monitoring occasion (MO) in the monitoring window of the downlink control channel according to a corresponding relation between the MO and the transmission beam.

Optionally, the corresponding relation between the MO and the transmission beam is a predetermined corresponding relation or a corresponding relation configured by a network side.

Optionally, when the corresponding relation between the MO and the transmission beam is the predetermined corresponding relation, the predetermined corresponding relation includes: a transmission beam corresponding to ith MO is corresponding to jth Synchronization Signal Block (SSB), wherein j=mod(i, Q), mod(i, Q) is a remainder of i divided by Q, i is a numbering value of a MO, j is a numbering value of a SSB, Q is the total number of SSBs sent by the network side; or, when the corresponding relation between the MO and the transmission beam is the corresponding relation configured by the network side, the corresponding relation is the corresponding relation configured by the network side through high-layer signaling.

Optionally, the downlink control channel is a downlink control channel carrying a power saving signal.

Optionally, the communication device is a terminal and the transmission beam is a receiving beam, the processor or the transceiver is configured to: detect, according to the receiving beam corresponding to the MO, reception of the downlink control channel on the MO.

Optionally, the processor or the transceiver is further configured to: stop detecting on remaining MOs in the monitoring window if the reception of the downlink control channel is detected.

Optionally, the communication device is a network side device and the transmission beam is a sending beam, the processor or the transceiver is configured to: send, according to the sending beam corresponding to the MO, the downlink control channel on the MO.

Some embodiments of the present disclosure further provide a computer readable storage medium having stored thereon a computer program, wherein the computer program is configured to be executed by a processor to implement the steps in the channel transmission method provided by some embodiments of the present disclosure.

In some embodiments of the present disclosure, the channel transmission method can determine a transmission beam corresponding to a monitoring occasion (MO) in a monitoring window of a downlink control channel and transmit, according to the transmission beam corresponding to the MO, the downlink control channel on the MO. In this way, the propagation delay of downlink control channel can be reduced and transmission reliability of the downlink control channel can be improved when a transmission beam change occurs.

DETAILED DESCRIPTION

To make technical problems, technical solutions, and advantages of this disclosure clearer, detailed description is provided below in combination with accompanying drawings and specific embodiments.

Figure 1:
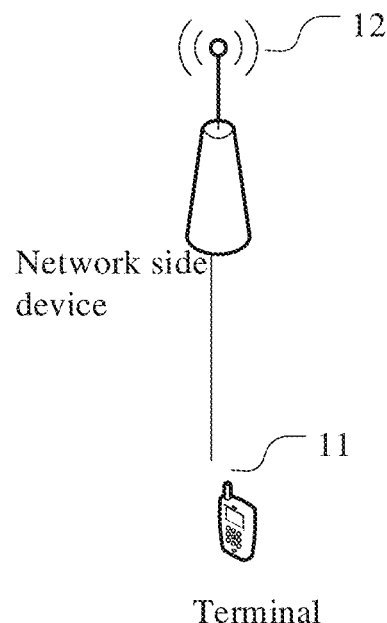
FIG. 1 is a schematic structural diagram of a network to which some embodiments of the present disclosure can be applied.

Referring to FIG. 1, FIG. 1 is a schematic structural diagram of a network to which some embodiments of the present disclosure can be applied. As shown in FIG. 1 the network includes a terminal 11 and a network side device 12. The terminal 11 can be a user equipment (UE) or any other terminal device, such as: a mobile phone, a Tablet Personal Computer, a Laptop Computer, a Personal Digital Assistant (PDA), a Mobile Internet Device (MID), a Wearable Device, a robot, a vehicle and other terminal side equipment. It should be noted that the terminal in some embodiments of the present disclosure is not limited to a particular type. The network side device 12 can be a base station, such as a macro station, an LTE eNB, a 5G NR NB, etc; the network side device can also be a small station, such as a Low Power Node (LPN), a pico station, and a femto stations, or an Access Point (AP); the network side device can also be a Central Unit (CU) or a network node such as a Transmission Reception Point (TRP). It should be noted that the network side device in some embodiments of the present disclosure is not limited to a specific type.

When a high frequency band (such as a FR2 band) is used for transmission, the network side device needs to configure multiple Transmission Configuration Indication (TCI) states for a Control Resource set (CORESET) and only one of the TCI states can be activated, which is used to determine a beam used for downlink control channel transmission. However, when the network side device fails to configure the TCI state for CORESET, the network side device and/or the terminal cannot determine the beam used for transmission of a downlink control channel which tends to cause a large propagation delay of the downlink control channel. Based on the above scenarios, various embodiments of the present disclosure are proposed below.

Figure 2:
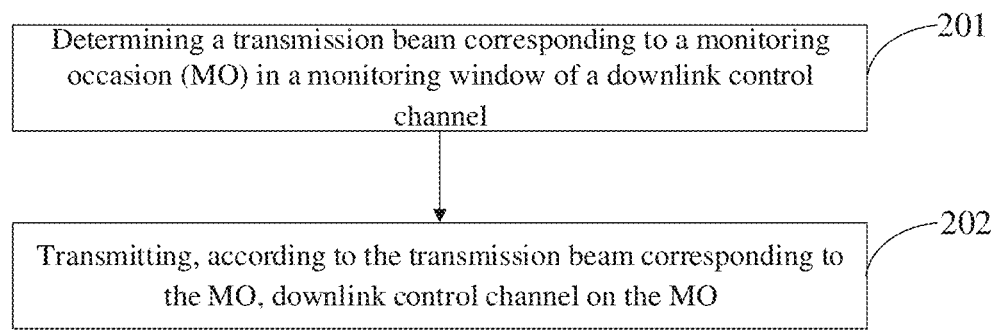
FIG. 2 shows a flowchart of a channel transmission method provided in an embodiment of the present disclosure.

Referring to FIG. 2, FIG. 2 is a flowchart of a channel transmission method provided in some embodiments of the present disclosure, the channel transmission method is performed by a communication device, the communication device may be a terminal as shown in FIG. 1 or a network side device as shown in FIG. 1. As shown in FIG. 2, the channel transmission method includes following steps 201-202.

Step 201: determining a transmission beam corresponding to a Monitoring Occasion (MO) in a monitoring window of a downlink control channel;

Step 202: transmitting, according to the transmission beam corresponding to the MO, the downlink control channel on the MO.

In some embodiments of the present disclosure, the communication device may be a terminal or a network side device. The transmission beam may be a receiving beam or a sending beam. Specifically, when the communication device is the terminal and the transmission beam is the receiving beam, accordingly, the terminal detects, according to the transmission beam corresponding to the MO, reception of a downlink control channel on the MO; when the communication device is the network side device and the transmission beam is the sending beam, accordingly, the network side device transmits, according to the transmission beam corresponding to the MO, the downlink control channel on the MO.

The communication device may determine the transmission beam corresponding to the monitoring occasion (MO) in a monitoring window of the downlink control channel according to a corresponding relation between the MO and the transmission beam. The corresponding relation between the MO and the transmission beam is predetermined or is configured by a network side.

In some embodiments of the present disclosure, before the communication device determines the transmission beam corresponding to the monitoring occasion (MO) in the monitoring window of the downlink control channel, the communication device needs to first determine the monitoring window of the downlink control channel. Specifically, the communication device may determine a predetermined monitoring window as the monitoring window of the downlink control channel, or determine the monitoring window of the downlink control channel based on configuration from the network side.

It can be understood that the network side device can configure only one search space or multiple search spaces for the terminal. When the network side device configures multiple search spaces for the terminal, MOs in different seach spaces in the monitoring window correspond to different transmission beams; that is, in this case, the corresponding relation between the MO and the transmission beam can be understood as a corresponding relation between the search space (SS) and the transmission beam.

It should be noted that, in some embodiments of the present disclosure, the channel transmission method provied by the present disclosure is only applied to a scenario where the network side device fails to configure a TCI state for a CORESET.

Opitionally, before the determining the transmission beam corresponding to the monitoring occasion (MO) in the monitoring window of the downlink control channel, the method further includes: determining the monitoring window of the downlink control channel.

In the embodiment, before the communication device determines the transmission beam corresponding to the monitoring occasion (MO) in the monitoring window of the downlink control channel, the communication device needs to first determine the monitoring window of the downlink control channel. The communication device may determine a predetermined monitoring window as the monitoring window of the downlink control channel, or determine the monitoring window of the downlink control channel based on configuration from the network side.

Opitionally, the monitoring window is a predetermined monitoring window or is a monitoring window configured by a network side.

When the monitoring window is a monitoring window configured by a network side, the monitoring window is a monitoring window configured by the network side through explicit signaling (such as a high-layer signaling).

Opitionally, when the monitoring window is a monitoring window configured by a network side, the monitoring window is a monitoring window configured by the network side through a high-layer signaling.

In the embodiment, the monitoring window is a monitoring window configured by the network side through a high-layer signaling, for example, the high-layer signaling can be Radio Resource Control (RRC) signaling, System Information Block Type 1 (SIB1), Other System Information (OSI), or MAC CE.

Optionally, determining the transmission beam corresponding to the monitoring occasion (MO) in the monitoring window of the downlink control channel includes: determining the transmission beam corresponding to the monitoring occasion (MO) in the monitoring window of the downlink control channel according to the corresponding relation between the MO and the transmission beam.

In the embodiment, the communication device determines the transmission beam corresponding to the monitoring occasion (MO) in the monitoring window of the downlink control channel according to the corresponding relation between the MO and the transmission beam. The communication device may determine the corresponding relation between the MO and the transmission beam based on a predetermined rule or based on configuration from the network side.

Optionally, the corresponding relation between the MO and the transmission beam is a predetermined corresponding relation or is a correspnding relation configured by a network side.

Optionally, when the corresponding relation between the MO and the transmission beam is the predetermined corresponding relation, the predetermined corresponding relation includes: a corresponding relation that a transmission beam corresponding to an i-th MO corresponds to a j-th Synchronization Signal Block (SSB), wherein j=mod(i, Q), mod(i, Q) is a remainder of i divided by Q, i is a numbering value of MO, j is a numbering value of SSB, Q is the total number of SSBs sent by the network side. When the corresponding relation between the MO and the transmission beam is the corresponding relation configured by the network side, the corresponding relation between the MO and the transmission beam is a corresponding relation configured by the network side through the high-layer signaling.

In the embodiment, when the corresponding relation between the MO and the transmission beam is the predetermined corresponding relation, a transmission beam corresponding to the i-th MO corresponds to the j-th Synchronization Signal Block (SSB), wherein j=mod(i, Q), mod(i, Q) is a remainder of i divided by Q, i is a numbering value of MO, j is a numbering value of SSB, Q is the total number of SSBs sent by the network side device.

For example, if the total number of SSBs sent by the network side is 4, that is, Q=4, when determining the transmission beam corresponding to first MO according to the above corresponding relation, i=1; accordingly, j=mod (1, 4)=1, so that it can be determined that the transmission beam corresponding to the first MO corresponds to the first SSB.

When the corresponding relation between the MO and the transmission beam is a corresponding relatoin configured by the network side, the corresponding relation between the MO and the transmission beam is a corresponding relation configured by the network side through high-layer signaling. The high-layer signaling is RRC or SIB1 or OSI or MAC CE.

Optionally, the downlink control channel is a downlink control channel carrying a power saving signal.

In the embodiment, the downlink control channel is a downlink control channel carrying a power saving signal.

It can be understood that the terminal enters a power-saving state after receiving the power saving signal. Therefore, the smaller the propagation delay of the power saving signal, the better the power-saving performance. In the embodiment, transmitting the power saving signal by using a Physical Downlink Control Channel (PDCCH) which is transmitted by the channel transmission method provided by the present disclosure can effectively reduce the propagation delay of a PDCCH, so as to reduce the propagationn delay of the power saving signal. In this way, the terminal can enter the power saving state much earlier according to the energy saving signal, thus improving the power saving performance of the terminal.

Optionally, the communication device is a terminal and the transmission beam is a receiving beam, and the transmitting, according to the transmission beam corresponding to the MO, the downlink control channel on the MO, includes: detecting, according to the receiving beam corresponding to the MO, reception of the downlink control channel on the MO.

In the embodiment, the communication device is a terminal, accordingly, the transmission beam is a receiving beam, the terminal transmits, according to the transmission beam corresponding to the MO, the downlink control channel on the MO. The terminal may detect reception of the downlink control channel on all MOs, or stop detecting on remaining MOs in the monitoring window if reception of the downlink control channel is detected.

Optionally, the method further includes: if the reception of the downlink control channel is detected, stopping detecting on remaining MOs in the monitoring window.

In the implementation, the terminal stops detecting on remaining MOs in the monitoring window if the reception of the downlink control channel is detected. In this way, communication resources are effectively saved.

Optionally, the communication device is the network side device and the transmission beam is a sending beam, wherein the transmitting, according to the transmission beam corresponding to the MO, the downlink control channel on the MO, includes: sending, according to the sending beam corresponding to the MO, the downlink control channel on the MO.

In the embodiment, the communication device is the network side device, accordingly, the transmission beam is a sending beam, and the network side device sends, according to the sending beam corresponding to the MO, the downlink control channel on the MO.

In some embodiments of the present disclosure, the channel transmission method determines the transmission beam corresponding to the monitoring occasion (MO) in a monitoring window of a downlink control channel and transmits, according to the transmission beam corresponding to the MO, the downlink control channel on the MO. In this way, when transmission beam changes, the propagation delay of the downlink control channel can be reduced and transmission reliability of a downlink control channel can be improved.

Figure 3:
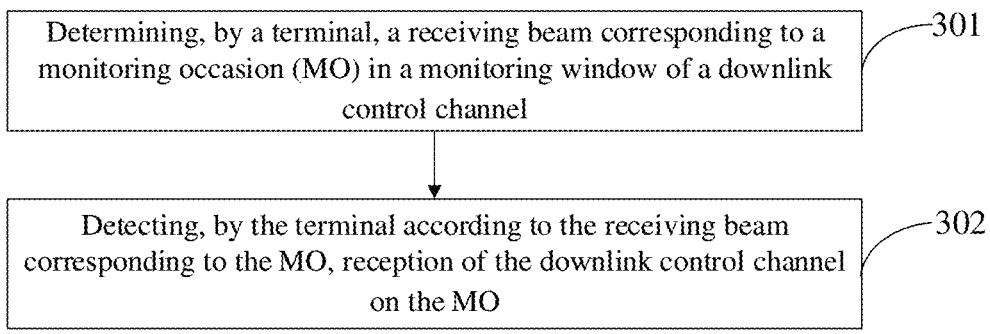
FIG. 3 shows a flowchart of an channel receiving method provided in an embodiment of the present disclosure.

Referring to FIG. 3, FIG. 3 is a flowchart of a channel receiving method provided in some embodiments of the present disclosure. The channel receiving method is performed by a terminal. As shown in FIG. 3, the channel receiving method includes following steps 301-302:

Step 301: a terminal determines a receiving beam corresponding to a monitoring occasion (MO) in a monitoring window of a downlink control channel.

Step 302: the terminal detects, according to the receiving beam corresponding to the MO, reception of the downlink control channel on the MO.

After the terminal determines the receiving beam corresponding to the MO, the terminal detects, according to the receiving beam corresponding to the MO, the reception of the downlink control channel on the MO. In some embodiments, the terminal stops detecting reception of the downlink control channel on remaining MOs in the monitoring window if the reception of the downlink control channel is detected.

Before the terminal determines the receiving beam corresponding to the monitoring occasion (MO) in the monitoring window, the terminal needs to first determine the monitoring window of the downlink control channel. The terminal may determine a predetermined (such as predetermined by a protocol) monitoring window as the monitoring window of the downlink control channel, for example, the monitoring window includes N MOs, or M MOs, N and M are positive integers. The terminal can also determine the monitoring window of the downlink control channel based on configuration from a network side. In some embodiments of the present disclosure, the network side device configures the monitoring window through explicit signaling (such as high-layer signaling).

It should be understood that when the terminal determines the monitoring window of the downlink control channel based on configuration from a network side, the terminal receives the high-layer signaling, carrying configuration informationof the monitoring window, sent by the network side device before determining the monitoring window of the downlink control channel and determines the monitoring window of downlink control channel according to the configuration information of the monitoring window carried by the high-layer signaling.

The terminal determines the receiving beam corresponding to the monitoring occasion (MO) in the monitoring window according to the corresponding relation between the MO and the receiving beam. The teriminal may determine the corresponding relation between the MO and the receiving beam based on a predetermined rule (such as a rule predetermined by a protocol) or based on configuration from the network side device.

When teriminal determines the corresponding relation between the MO and the receiving beam based on the predetermined rule, the terminal determines the corresponding relation between the MO and the receiving beam through the predetermined rule based on the number and numbering values of SSBs sent by the network side device, the number and numbering values of MOs in the monitoring window. The predetermined rule includes: a rule that a receiving beam corresponding to an i-th MO corresponds to the j-th Synchronization Signal Block (SSB), wherein j=mod(i, Q), mod(i, Q) is a remainder of i divided by Q, i is the numbering value of a MO, j is the numbering value of a SSB, Q is the total number of SSBs sent by the network side.

When the terminal determines the corresponding relation between the MO and the receiving beam based on configuration from network side device, the network side device configures the corresponding relation between the MO in a receiving window and the receiving beam for the terminal through the explicit signaling (such as the high-layer signaling), for example, the network side device configures a SSB index corresponding to each MO in the receiving window for the terminal. Specifically, the terminal receives the high-layer signaling, carrying the corresponding relation between the MO and the receiving beam, sent by the network side device and determines the corresponding relation between the MO and the receiving beam according to the high-layer signaling.

Figure 4:
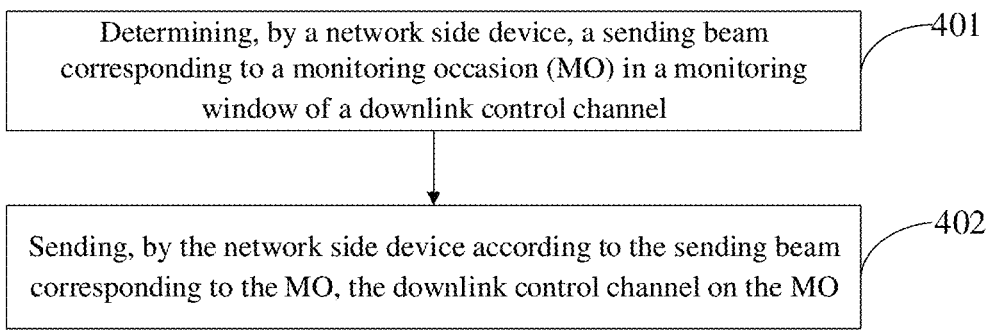
FIG. 4 shows a flowchart of an channel sending method provided in an embodiment of the present disclosure.

Referring to FIG. 4, FIG. 4 is a flowchart of a channel sending method provided in some embodiments of the present disclosure, the channel sending method is performed by a network side device. As, shown in FIG. 4, the channel sending method includes following steps 401-402.

Step 401: the network side device determines a sending beam corresponding to a monitoring occasion (MO) in a monitoring window of a downlink control channel;

Step 402: the network side device sends, according to the sending beam corresponding to the MO, a downlink control channel on the MO.

The network side device sends, according to the sending beam corresponding to the MO, the downlink control channel on the MO after determining the sending beam corresponding to the MO. Before the network side device determines the sending beam corresponding to the monitoring occasion (MO) in the monitoring window, the network side device needs to first determine the monitoring window of the downlink control channel. The network side device may determine a predetermined monitoring window as the monitoring window of the downlink control channel, or configures the monitoring window of the downlink control channel. It should be understood that when the network side device configures the monitoring window of the downlink control channel, the network side device also needs to send the configured monitoring window to a terminal, so that the terminal can determine the monitoring window of the downlink control channel, for example, sending the configured monitoring window to the terminal through explicit signaling, specific method of this configuring has been described in detail on the terminal side and will not be described here.

The network side device determines the sending beam corresponding to the MO in the monitoring window according to a corresponding relation between the MO and the sending beam. The network side device determines the corresponding relation between the MO and the sending beam according to a predetermined rule (such as a rule predefined by a protocol) or configures the corresponding relation between the MO and the sending beam.

When the network side device determines the corresponding relation between the MO and the sending beam according to the predetermined rule, the network side device may determine the corresponding relation between the MO and the sending beam through the predetermined rule based on the number or the numbering values of SSBs sent by the network side device, the number or the numbering values of MOs in the monitoring window. The predetermined rule includes: a rule that a sending beam corresponding to the i-th MO corresponds to the j-th Synchronization Signal Block (SSB), wherein j=mod(i, Q), mod(i, Q) is a remainder of i divided by Q, i is the numbering value of a MO, j is the numbering value of a SSB, Q is the total number of SSBs sent by the network side device.

Detailed description of the solutions of the present disclosure are described hereinafter according to the specific embodiments.

Embodiment 1

Assuming that a power saving signal (PS) is carried by a PDCCH. A network side device configures a search space SS#L for the PDCCH (PS-PDCCH) carrying the PS, and the CORESET associated with the SS#L is CORESET#B, that is, SS#L needs to be transmitted in CORESET#B. The network side device does not configure any TCI state for CORESET#B. A cycle of the SS#L is configured as one slot, and the monitoring window of the PS-PDCCH is configured as W by the network side device, in this embodiment, W=5, i.e., five slots. There are Q SSBs in a system. In this embodiment, Q=4, that is, SSBs sent by the network side device are {SSB#1, SSB#2, SSB#3, SSB#4}.

A terminal and a network side device determine a transmission beam corresponding to each monitoring occasion (MO) in a monitoring window of the PS-PDCCH based on a predetermined rule, specfically, a transmission beam corresponding to the i-th MO is determined by the SSB having a numbering value j, j=mod(i, Q), that is, a beam direction of the transmission beam corresponding to the i-th MO is the same as that of the j-th SSB.

Figure 5:
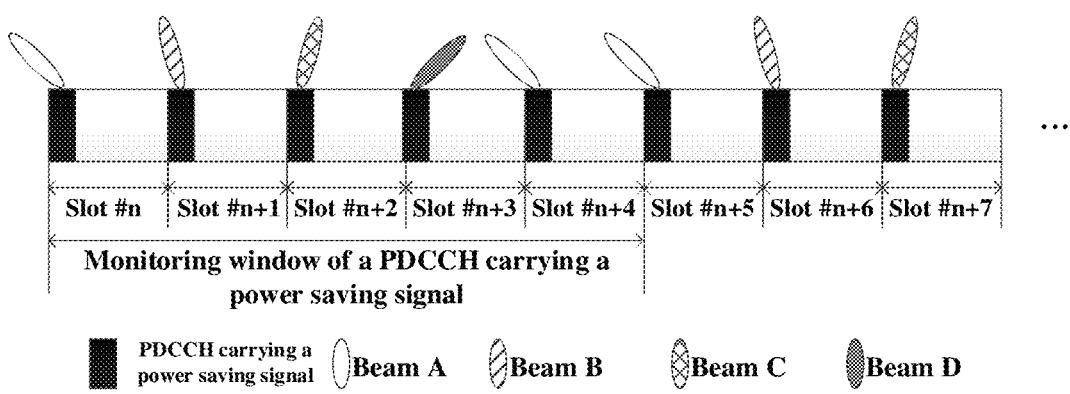
FIG. 5 is a schematic diagram of a first example of a corresponding relation between MO and a transmission beam provided in some embodiments of the present disclosure.

In the case of Q=4, it can be determined that the transmission beam corresponding to the first MO in the monitoring window is determined by SSB#1, the transmission beam corresponding to the second MO is determined by SSB#2, the transmission beam corresponding to the third MO is determined by SSB#3, the transmission beam corresponding to the fourth MO is determined by SSB#4, and the transmission beam corresponding to the fifth MO is determined by SSB#1. Assuming that a direction corresponding to SSB#1 is the same as a beam direction of a beam A, a direction corresponding to SSB#2 is the same as a beam direction of a beam B, a direction corresponding to SSB#3 is the same as a beam direction of a beam C, and a direction corresonding to SSB#4 is the same as a beam direction of a beam D, the terminal or the network side device can determine the corresponding relation between the MO and the transmission beam as shown in FIG. 5.

The network side device sends the PS-PDCCH on SS#L according to corresponding sending beam in each MO of the monitoring window of the PS-PDCCH. The terminal receives the PS-PDCCH on SS#L according to corresponding sending beam in each MO of the monitoring window of the PS-PDCCH. For the terminal, the terminal may detect the PS-PDDCH according to a corresponding transmission beam in each MO of the monitoring window, or stops detecting in remaining MOs in the monitoring window after the PS-PDCCH is detected.

Embodiment 2

As described in embodiment 1, the monitoring window of the PS-PDCCH is a predetermined monitoring window.

Embodiment 3

Assuming that a power saving signal (PS) is carried by a PDCCH. A network side device configures a search space SS#L for the PDCCH carrying the PS(PS-PDCCH), and the CORESET associated with the SS#L is CORESET#B, that is, SS#L needs to be transmitted in CORESET#B. The network side device does not configure any TCI states for CORESET#B. A cycle of the SS#L is configured as one slot, and the monitoring window of the PS-PDCCH is configured as W by the network side device, in this embodiment, W=10, i.e., ten slots. There are Q SSBs in a system, in this embodiment, Q=4, that is, SSBs sent by the network side device are {SSB#1, SSB#2, SSB#3, SSB#4}.

Figure 6:
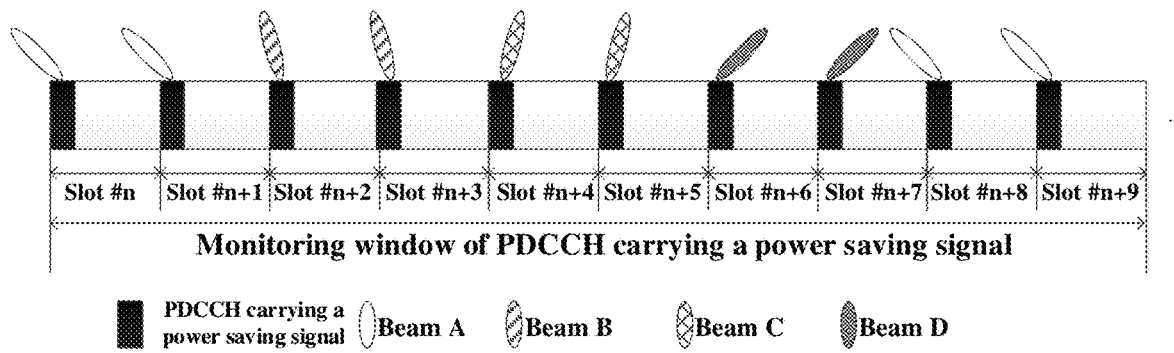
FIG. 6 is a schematic diagram of a second example of a corresponding relation between the MO and the transmission beam provided in some embodiments of the present disclosure.

The network side device indicates sending and receiving beams corresponding to each MO in the monitoring window of the PS-PDCCH though high-layer signaling, such as RRC signaling, SIB1, OSI or MAC CE indication. Specifically, the network side device indicates, through the high-layer signaling, that a beam corresponding to the first MO in the monitoring window is determined by SSB#1, a beam corresponding to the second MO is determined by SSB#1, a beam corresponding to the third MO is determined by SSB#2, a beam corresponding to the fourth MO is determined by SSB#2, a beam corresponding to the fifth MO is determined by SSB#3, a beam corresponding to the sixth MO is determined by SSB#3, a beam corresponding to the seventh MO is determined by SSB#4, a beam corresponding to the eighth MO is determined by SSB#4, a beam corresponding to the nineth MO is determined by SSB#1. Assuming that a direction corresponding to SSB#1 is the same as a beam direction of a beam A, a direction corresponding to SSB#2 is the same as a beam direction of a beam B, a direction corresonding to SSB#3 is the same as a beam direction of a beam C, and a direction of SSB#4 corresponds to the same as a beam direction of a beam D, the corresponding relation between the MO and the transmission beam is shown in FIG. 6.

The network side device sends the PS-PDCCH according to a corresponding sending beam on SS#L in each MO in the monitoring window of the PS-PDCCH. A terminal receives the PS-PDCCH according to a corresponding beam on SS#L of each MO in the monitoring window of the PS-PDCCH. For the terminal, the terminal may detect the PS-PDCCH according to a corresponding transmission beam on each MO in the monitoring window, or stops detecting on remaining MOs in the monitoring window if the PS-PDCCH is detected.

Figure 7:
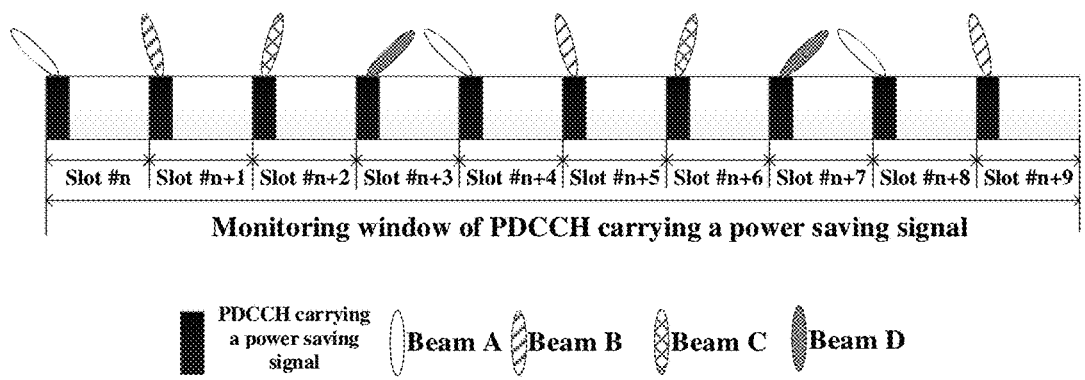
FIG. 7 is a schematic diagram of a third exmple of a corresponding relation between the MO and the transmission beam provided in some embodiments of the present disclosure.

Of course, the network side device can arbitrarily configure the corresponding relation between the MO and the transmission beam, for example, the corresponding relation shown in FIG. 7.

Embodiment 4

As described in embodiment 3, the monitering window of the PS-PDCCH is a predetermined monitoring window.

Embodiment 5

As described in embodiments 1-4, a monitering perid of the SS#L can be less than one slot, for example there exist M MOs in a slot.

Figure 8:
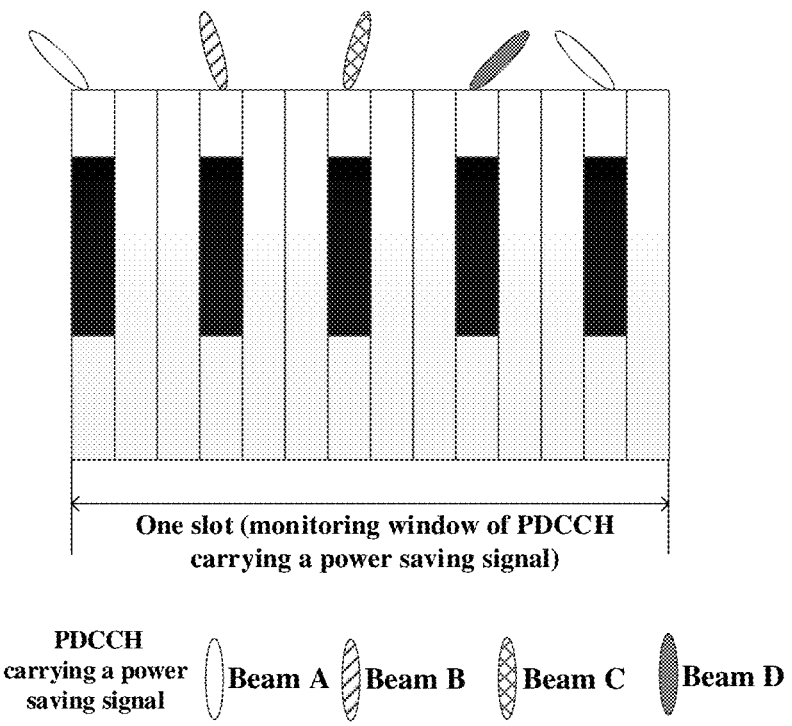
FIG. 8 is a schematic diagram of a fourth example of a corresponding relation between the MO and the transmission beam provided in some embodiments of the present disclosure.

Assuming that the monitering perid of the SS#L is 3 Orthogonal Frequency Division Multiplexing (OFDM) symbols, the monitering window of the PS-PDCCH is 1 ms, SCS=15 kHz, SCS is subcarrier spacing. Then a corresponding relation between the MO and the transmission beam can be shown in FIG. 8.

Figure 9:
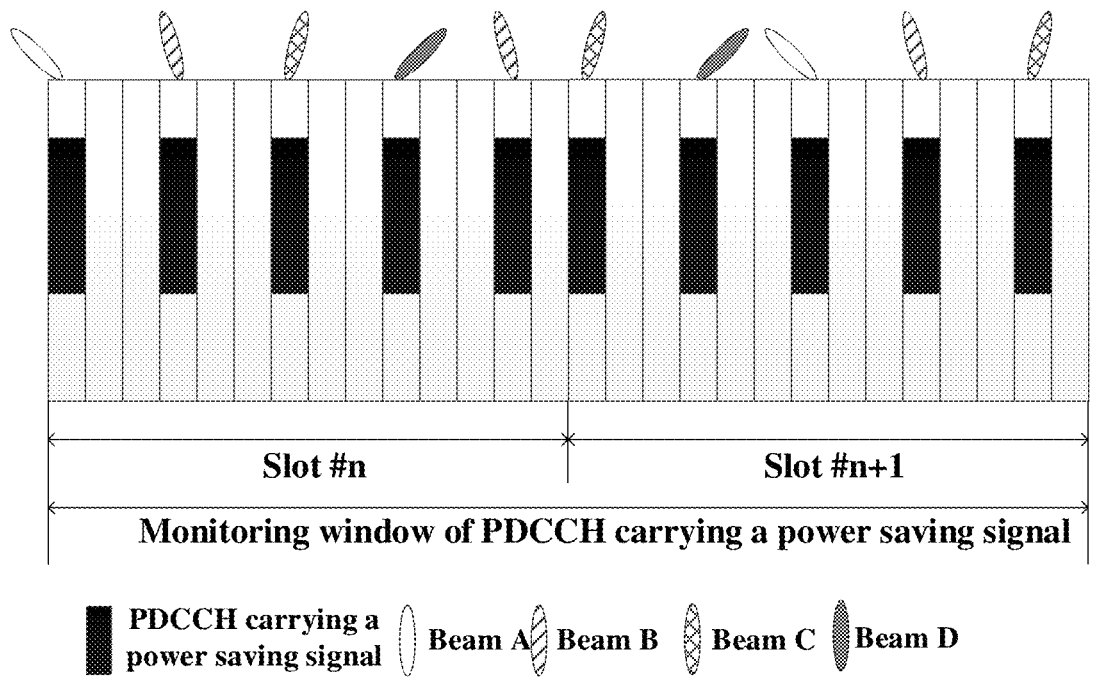
FIG. 9 is a schematic diagram of a fifth example of a corresponding relation between the MO and the transmission beam provided in some embodiments of the present disclosure.

Assuming that the monitering perid of the SS#L is 3 Orthogonal Frequency Division Multiplexing (OFDM) symbols, the monitering window of the PS-PDCCH is 2 ms, SCS=15 kHz, SCS is the subcarrier spacing. Then a corresponding relation between the MO and the transmission beam can be shown in FIG. 9.

In the above embodiments, a PDCCH carrying a power saving signal is only taken as an example for illustratation, but this is not limited, the PDCCH is not limited to carry the power saving signal, but also carry other information. In the above embodiments, the SS#L can be UE-specific Search Space (USS), or the SS#L can be a Common Search Space (CSS).

Figure 10:
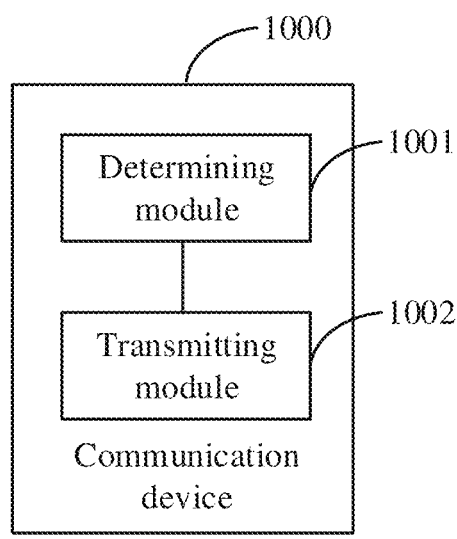
FIG. 10 is a schematic structural diagram of a communication device provided in some embodiments of the present disclosure.

Referring to FIG. 10, FIG. 10 is a schematic structural diagram of a communication device provided in some embodiments of the present disclosure. As shown in FIG. 10, a communication device 1000 includes: a determining module 1001, configured to determine a transmission beam corresponding to a monitoring occasion (MO) in a monitoring window of a downlink control channel; a transmitting module 1002, configured to transmit, according to the transmission beam corresponding to the MO, the downlink control channel on the MO.

Optionally, the determining module 1001 is further configured to: determine the monitoring window of the downlink control channel.

Optionally, the monitoring window is a predetermined monitoring window or is a monitoring window configured by a network side.

Optionally, when the monitoring window is a monitoring window configured by the network side, the monitoring window is a monitoring window configured by the network side through high-layer signaling.

Optionally, the determining module 1001 is specifically configured to: determine the transmission beam corresponding to the monitoring occasion (MO) in the monitoring window of the downlink control channel according to a corresponding relation between the MO and the transmission beam.

Optionally, the corresponding relation between the MO and the transmission beam is a predetermined corresponding relation or a corresponding relation configured by a network side.

Optionally, when the corresponding relation between the MO and the transmission beam is the predetermined corresponding relation, the predetermined corresponding relation includes: a relation that a transmission beam corresponding to an i-th MO corresponds to a j-th Synchronization Signal Block (SSB), wherein j=mod(i, Q), mod(i, Q) is a remainder of i divided by Q, i is a numbering value of a MO, j is a numbering value of a SSB, Q is the total number of SSBs sent by the network side device; or, when the corresponding relation between the MO and the transmission beam is a corresponding relation configured by the network side, the corresponding relation between the MO and the transmission beam is configured by the network side through the high-layer signaling.

Optionally, the downlink control channel is a downlink control channel carrying a power saving signal.

Optionally, the communication device is a terminal and the transmission beam is a receiving beam, the transmitting module 1002 is specifically configured to: detect, according to the receiving beam corresponding to the MO, reception of the downlink control channel on the MO.

Optionally, the transmitting module 1002 is further configured to: stop detecting on remaining MOs in the monitoring window if the reception of the downlink control channel is detected.

Optionally, the communication device is a network side device, the transmission beam is a sending beam, the transmitting module 1002 is specifically configured to: send, according to the sending beam corresponding to the MO, the downlink control channel on the MO.

It should be noted that the above communication device 1000 of the embodiment can be the communication device in any of the method embodiments in some embodiments of the present disclosure, any embodiment of the communication device in the method embodiments of the present disclosure can be performed by the above communication device 1000 in the embodiment and the same beneficial effects can be achieved, which will not be described here.

Figure 11:
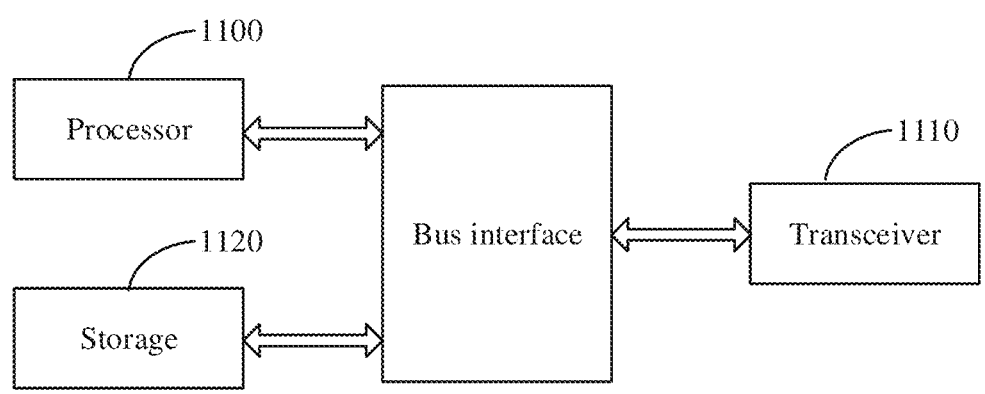
FIG. 11 is another schematic structural diagram of a communication device provided in some embodiments of the present disclosure.

Referring to FIG. 11, FIG. 11 is another schematic structural diagram of a communication device provided in some embodiments of the present disclosure, as shown in FIG. 11, the terminal includes: a transceiver 1110, a storage 1120, a processor 1100 and a computer program stored on the storage 1120 and executable by the processor 1100. The processor 1100 is congfigured to determine a transmission beam corresponding to a monitoring occasion (MO) in a monitoring window of a downlink control channel; the processor (1100) or the transceiver (1110) is configured to transmit, according to the transmission beam corresponding to the MO, the downlink control channel on the MO.

The transceiver 1110 is congfigured to receive and send data under a contol of the processor 1100.

In FIG. 11, a bus architecture may include any number of interconnected buses and bridges. Specifically, various circuits such as one or more processors represented by the processor 1100 and a memory represented by the storage 1120 are linked together. The bus architecture can also link various other circuits such as peripherals, voltage regulators, power management circuits, etc., which are all known in the art, and therefore, will not be further described herein. The bus interface provides the interface. The transceiver 1110 may be a plurality of elements, including a transmitter and a transceiver, for providing a unit for communicating with various other devices on a transmission medium.

The processor 1100 is responsible for managing the bus architecture and general processing, and the storage 1120 may store data used by the processor 1100 when performing operations.

It should be noted that the storage 1120 is not limited to be within the terminal, and can be separated from processor 1100 and be in different geographical locations.

Optionally, before the processor 1100 is configured to determine a transmission beam corresponding to a monitoring occasion (MO) in a monitoring window of a downlink control channel, the processor is further configured to: determine the monitoring window of the downlink control channel.

Optionally, the monitoring window is a predetermined monitoring window or a monitoring window configured by a network side.

Optionally, when the monitoring window is the monitoring window configured by the network side, the monitoring window is a monitoring window configured by the network side through high-layer signaling.

Optionally, the processor 1100 is specifically configured to: determine the transmission beam corresponding to the monitoring occasion (MO) in the monitoring window of the downlink control channel according to a corresponding relation between the MO and the transmission beam Optionally, the corresponding relation between the MO and the transmission beam is a predetermined corresponding relation or a corresponding relation configured by a network side.

Optionally, when the corresponding relation between the MO and the transmission beam is the predetermined corresponding relation, the predetermined corresponding relation includes: a corresponding relation that a transmission beam corresponding to the i-th MO corresponds to the j-th Synchronization Signal Block (SSB), wherein j=mod(i, Q), mod(i, Q) is a remainder of i divided by Q, i is a numbering value of a MO, j is a numbering value of a SSB, Q is the total number of SSBs sent by the network side device. When the corresponding relation between the MO and the transmission beam is the corresponding relation configured by the network side, the corresponding relation between the MO and the transmission beam is the corresponding beam configured by the network side through the high-layer signaling.

Optionally, the downlink control channel is a downlink control channel carrying a power saving signal.

Optionally, the communication device is a terminal and the transmission beam is a receiving beam, the processor 1100 or the transceiver 1110 is specifically configured to: detect, according to the receiving beam corresponding to the MO, reception of the downlink control channel on the MO.

Optionally, the processor 1100 or the transceiver 1110 is further congfigured to: stop detecting on remaining MOs in the monitoring window if the reception of the downlink control channel is detected.

Optionally, the communication device is a network side device and the transmission is a sending beam, the processor 1100 or the transceiver 1110 is specifically configured to: send, according to the sending beam corresponding to the MO, the downlink control channel on the MO.

It should be noted that the above communication device 1000 of the embodiment can be the communication device of any of method embodiments in some embodiments of the present disclosure, any implementation of of the communication device in the method embodiments in some embodiments of the present disclosure can be performed by the above communication device 1000 and the same beneficial effects can be achieved, which will not be described here.

Some embodiments of the present disclosure further provide a computer readable storage medium having stored therein a computer program, wherein the computer program is configured to be executed by a processor to implement the steps in the channel transmission method provided by some embodiments of the present disclosure.

In the several embodiments provided in this application, it should be understood that the disclosed methods and devices can be implemented in other ways. For example, the device embodiments described above are only schematic, for example, division to units is just as a logical functional division, there can be other divisions in actual implementation, such as multiple units or components can be combined with or can be integrated into another system, or some characteristics can be ignored, or are not performed. On the other hand, coupling or direct coupling or communication connections between each other shown or discussed may be indirect coupling or communication connections through some interface, device or unit, and may be electrical, mechanical or otherwise.

In addition, functional units in each embodiment of this disclosure can be integrated into a processing unit, or each unit can be physically included separately, or two or more units can be integrated into a unit. The integrated units mentioned above can be realized in the form of hardware or in form of hardware plus a software function unit.

The above integrated units, in the form of software functional units, can be stored in a computer readable storage medium. The software functional unit is stored in a storage medium and includes instructions for causing a computer device (which can be a personal computer, a server, or a network device, etc.) to perform part of the processing method of the information data block described in each embodiment of this disclosure. The aforementioned storage mediums include USB flash disk, portable hard disk, Read-Only Memory (ROM), Random Access Memory (RAM), magnetic disks or compact disc sand other media that can store program codes.

It is understood that these embodiments described in this disclosure may be implemented with hardware, software, firmware, middleware, microcode, or a combination of them. For hardware implementation, modules, units, submodules, subunits, etc. can be implemented in one or more of Application Specific Integrated Circuits (ASICs), Digital Signal Processing (DSP), a DSP Device (DSPD), a Programmable Logic Device (PLD), a Field-programmable Gate Array (FPGA), a general-purpose processor, a controller, a microcontroller, a microprocessor, other electronic units for performing the functions described in this disclosure, or a combination thereof.

The above are optional implementations of the present disclosure. It should be noted that those skilled in the art can make various improvements and modifications to the present disclosure without departing from the principle of the present disclosure, and these improvements and modifications should also be considered within the protection scopes of the present disclosure.

The invention claimed is:

1. A channel transmission method, performed by a communication device, comprising:
   determining a transmission beam corresponding to a monitoring occasion (MO) in a monitoring window of a downlink control channel;
   transmitting, according to the transmission beam corresponding to the MO, the downlink control channel on the MO;
   wherein the determining the transmission beam corresponding to the monitoring occasion (MO) in the monitoring window of the downlink control channel, comprises:
      determining the transmission beam corresponding to the monitoring occasion (MO) in the monitoring window of the downlink control channel according to a corresponding relation between the MO and the transmission beam;
   wherein the downlink control channel is a downlink control channel carrying a power saving signal,
   wherein the communication device is a terminal, stopping detecting on remaining MOs in the monitoring window, if the reception of the downlink control channel is detected.

2. The channel transmission method according to claim 1, wherein before the determining the transmission beam corresponding to the monitoring occasion (MO) in the monitoring window of the downlink control channel, the method further comprises:
   determining the monitoring window of the downlink control channel.

3. The channel transmission method according to claim 2, wherein the monitoring window is a predetermined monitoring window or a monitoring window configured by a network side.

4. The channel transmission method according to claim 2, wherein when the monitoring window is the monitoring window configured by the network side, the monitoring window is a monitoring window configured by the network side through high-layer signaling.

5. The channel transmission method according to claim 1, wherein the corresponding relation between the MO and the transmission beam is a predetermined corresponding relation or a corresopnding relation configured by the network side.

6. The channel transmission method according to claim 5, wherein,
   when the corresponding relation between the MO and the transmission beam is the predetermined corresponding relation, the predetermined corresponding relation comprises:
   a corresponding relation that a transmission beam corresponding to an i-th MO corresponds to a j-th Synchronization Signal Block (SSB), wherein j=mod(i, Q), mod(i, Q) is a remainder of i divided by Q, i is a numbering value of a MO, j is a numbering value of a SSB, Q is the total number of SSB sent by the network side; or,
   when the corresponding relation between the MO and the transmission beam is the corresponding relation configured by the network side, the corresponding relation between the MO and the transmission beam is a corresponding relation configured by the network side through a high-layer signaling.

7. The channel transmission method according to claim 1, wherein the communication device is a terminal and the transmission beam is a receiving beam,
   wherein the transmitting, according to the transmission beam corresponding to the MO, the downlink control channel on the MO, comprises:
      detecting, according to the receiving beam corresponding to the MO, reception of the downlink control channel on the MO.

8. The channel transmission method according to claim 1, wherein the communication device is a network side device and the transmission beam is a sending beam, wherein the transmitting, according to the transmission beam corresponding to the MO, the downlink control channel on the MO, comprises:

sending, according to the sending beam corresponding to the MO, the downlink control channel on the MO.

9. A communication device, comprising: a transceiver, a storage, a processor and a computer program stored on the storage and executable by the processor, wherein, the processor is congfigured to determine a transmission beam corresponding to a monitoring occasion (MO) in a monitoring window of a downlink control channel;

the processor or the transceiver is configured to transmit, according to the transmission beam corresponding to the MO, the downlink control channel on the MO;

wherein the processor is specifically configured to:

determine the transmission beam corresponding to the monitoring occasion (MO) in the monitoring window of the downlink control channel according to a corresponding relation between the MO and the transmission beam;

wherein the downlink control channel is a downlink control channel carrying a power saving signal, wherein the communication device is a terminal, the processor is further configured to stop detecting on remaining MOs in the monitoring window, if the reception of the downlink control channel is detected.

10. The communication device according to claim 9, wherein before the processor is configured to determine the transmission beam corresponding to the MO in the monitoring window of the downlink control channel, the processor is further configured to:

determine the monitoring window of the downlink control channel.

11. The communication device according to claim 10, wherein the monitoring window is a predetermined monitoring window or a monitoring window configured by a network side.

12. The communication device according to claim 11, wherein when the monitoring window is the monitoring window configured by the network side, the monitoring window is a monitoring window configured by the network side through high-layer signaling.

13. The communication device according to claim 9, wherein the corresponding relation between the MO and the transmission beam is a predetermined corresponding relation or a corresponding relation configured by a network side.

14. The communication device according to claim 13, wherein, when the corresponding relation between the MO and the transmission beam is the predetermined corresponding relation, the predetermined corresponding relation comprises:

a corresponding relation that a transmission beam corresponding to an i-th MO corresponds to a j-th Synchronization Signal Block (SSB), wherein j=mod(i, Q), mod(i, Q) is a remainder of i divided by Q, i is a numbering value of MO, j is a numbering value of SSB, Q is the total number of SSBs sent by the network side;

or, when the corresponding relation between the MO and the transmission beam is the corresponding relation configured by the network side, the corresponding relation is a corresponding relation configured by the network side through high-layer signaling.

15. The communication device according to claim 9, wherein the communication device is a terminal and the transmission beam is a receiving beam, the processor or the transceiver is specifically configured to:

detect, according to the receiving beam corresponding to the MO, reception of the downlink control channel on the MO.

16. The communication device according to claim 9, wherein the communication device is a network side device and the transmission beam is a sending beam, the processor or the transceiver is specifically configured to:

send, according to the sending beam corresponding to the MO, the downlink control channel on the MO.

17. A non-transitory computer readable storage medium, having stored therein a computer program, wherein the computer program is configured to be executed by a processor to implement following steps:

determining a transmission beam corresponding to a monitoring occasion (MO) in a monitoring window of a downlink control channel;

transmitting, according to the transmission beam corresponding to the MO, the downlink control channel on the MO;

wherein the determining the transmission beam corresponding to the monitoring occasion (MO) in the monitoring window of the downlink control channel, comprises:

determining the transmission beam corresponding to the monitoring occasion (MO) in the monitoring window of the downlink control channel according to a corresponding relation between the MO and the transmission beam;

wherein the downlink control channel is a downlink control channel carrying a power saving signal, wherein the communication device is a terminal, stopping detecting on remaining MOs in the monitoring window, if the reception of the downlink control channel is detected.

* * * * *